Figure 1A:
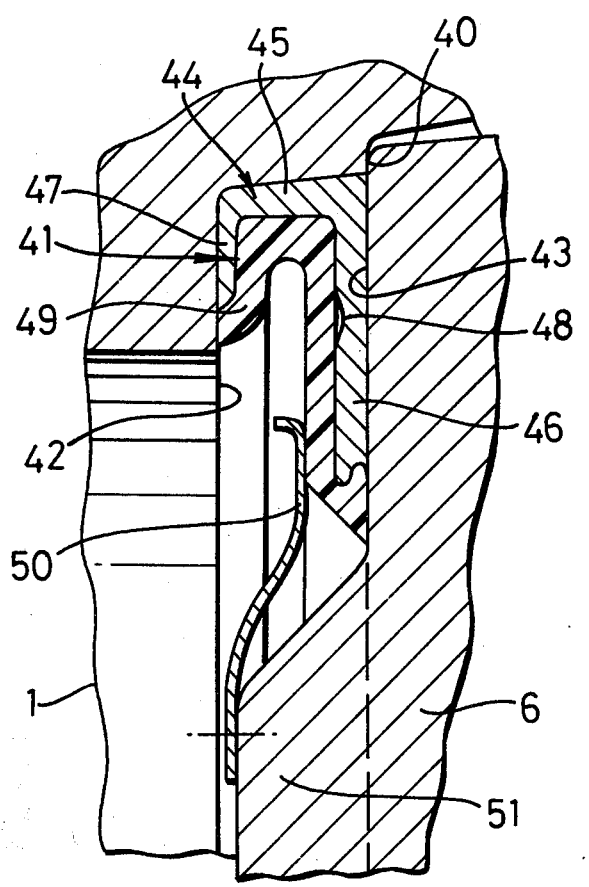

United States Patent [19]

Platts

[11] 4,140,240
[45] Feb. 20, 1979

[54] CLOSURE FOR PIPES OR PRESSURE VESSELS

[75] Inventor: Douglas J. Platts, Worksop, England

[73] Assignee: General Descaling Company Limited, Worksop, England

[21] Appl. No.: 841,894

[22] Filed: Oct. 13, 1977

[30] Foreign Application Priority Data

Nov. 1, 1976 [GB] United Kingdom ............... 45281/76

[51] Int. Cl.² ............................................ B65D 45/28
[52] U.S. Cl. .................... 220/323; 220/319;
138/89; 292/256.69; 292/256.67
[58] Field of Search ............... 220/231, 319, 325, 323;
49/465; 138/89; 292/256.65, 256.67, 256.69

[56] References Cited

U.S. PATENT DOCUMENTS

| 2,721,094 | 10/1955 | Webster | 292/256.69 |
|---|---|---|---|
| 2,757,820 | 8/1956 | Wall | 292/256.69 |
| 3,429,476 | 2/1969 | Hunter | 292/256.67 |
| 3,667,649 | 6/1972 | Thillet | 220/323 |

Primary Examiner—George T. Hall
Attorney, Agent, or Firm—Charles E. Brown

[57] ABSTRACT

A closure for a pipe or pressure vessel comprises a door adapted to fit into an aperture in a pipe or pressure vessel and an arcuate locking member disposed around the periphery of the door for locking the door to the pipe or pressure vessel, the ends of the locking member being movable towards and away from each other to cause radial expansion and contraction of the locking member, whereby the locking member is brought into and out of locking engagement with the pipe or pressure vessel. A seal for the closure comprises a rigid, usually annular, support having first and second flanges for engaging respective opposed faces on the closure and the pipe or pressure vessel, the first flange having a greater surface area and being less flexible than the second flange, and a flexible lining carried by the support and extending beyond the terminal edges of the flanges.

16 Claims, 3 Drawing Figures

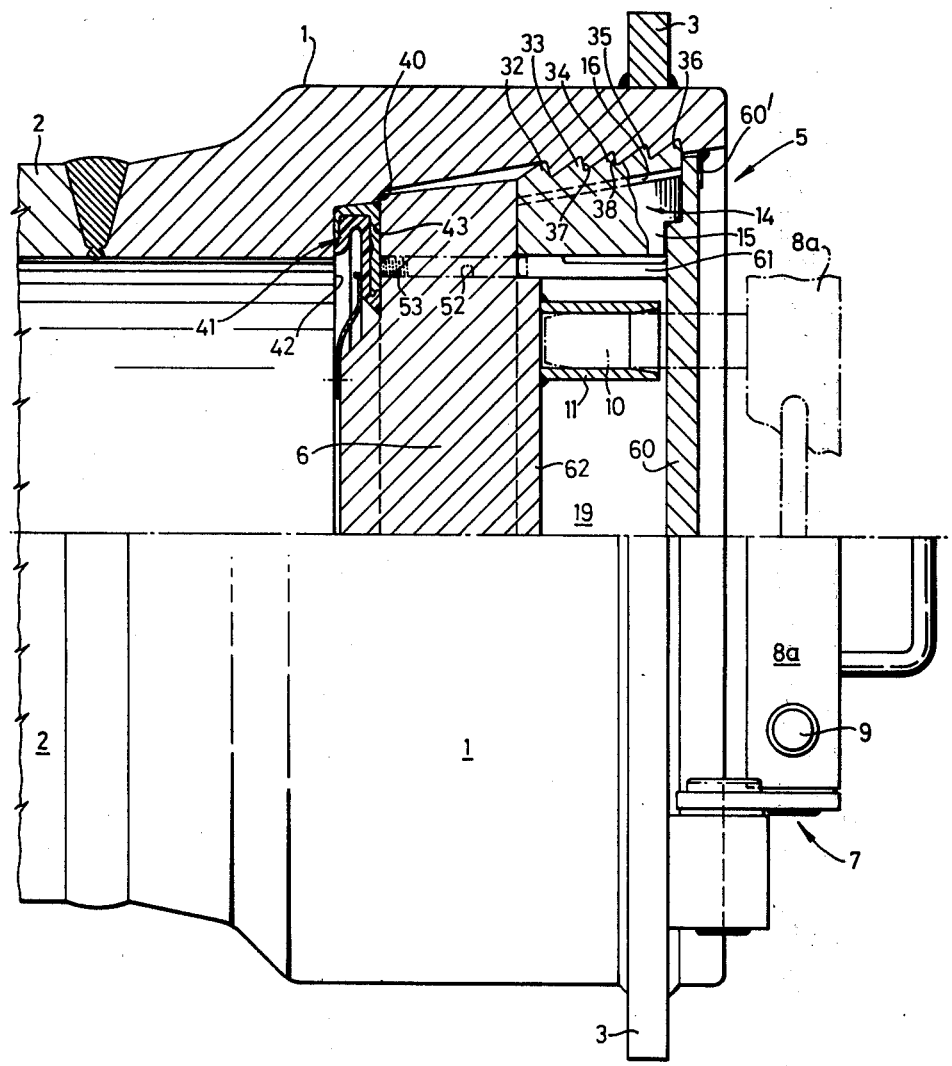

CLOSURE FOR PIPES OR PRESSURE VESSELS

The present invention relates to closures for pipes or pressure vessels and to seals for such closures.

Our British Patent Application No. 23537/74 discloses and claims a closure member for a pipe or pressure vessel comprising a door adapted to fit an aperture in the body of pipe or the pressure vessel, a plurality of blocks slidably mounted adjacent the periphery of the door and movable from a position at least substantially wholly within the said periphery to a position in which a part of each block protrudes beyond the periphery for engagement with the said body, the said parts of the blocks together forming a protrusion extending substantially entirely around the periphery of the door, and means for moving the blocks from the withdrawn to the protruding position.

The closure member of our earlier patent specification was particularly designed for relatively large apertures in pipes and pressure vessels which are subject to high pressures. The complexity of the construction of the closure member prevents a similar design from being readily used in closures for small apertures.

According to the present invention we provide a closure for a pipe or pressure vessel comprising a door adapted to fit into an aperture in the pipe or pressure vessel, and an arcuate locking member disposed around the periphery of the door for locking the door to the pipe or pressure vessel, the ends of the locking member being movable towards and away from each other to cause radial expansion and contraction of the locking member, whereby the locking member may be brought into and out of locking engagement with the pipe or pressure vessel.

By replacing the plurality of blocks used as locking members in the closure of our earlier patent specification by a single arcuate locking member, the construction of the closure can be considerably simplified.

Where the closure is to be used in a circular aperture, the locking member will usually comprise a generally annular, or C-shaped, body. It will be appreciated that the radial width of the locking member must be sufficient to ensure adequate engagement of the locking member with both the door and the walls of the pipe or pressure vessel in which the closure is fitted. Since the resistance to bending of the locking member will increase with the radial thickness of the member, the locking member is preferably shaped or constructed to accommodate the radial expansion and contraction of the locking member. For example, a locking member in the form of a generally annular body may be provided with a set of radial recesses in its outer or inner peripheral surface. These recesses suitably take the form of slots extending from the peripheral surface through a substantial part of the radial width of the locking member. In order to minimize stress concentration at the inner ends of the slots, they preferably terminate in openings of a size larger than the width of the slot, for example axial bores through the locking member.

Alternatively the locking member may be constructed in the form of a plurality of segmental blocks mounted on a C-shaped rim, the blocks being separated from each other by an amount sufficient to accommodate the expansion and contraction of the locking member.

Preferably, the peripheral surface of the locking member includes one or more ribs, one surface of the or each of which forms a bearing surface adapted to engage with a corresponding bearing surface in the walls of the pipe or pressure vessel. It is desirable that there should be at least three preferably five bearing surfaces on the locking member. The bearing surfaces may extend at right angles to the axis of the locking member or they may be inclined to the plane of the locking member. Thus, the ribs on which the bearing surfaces are formed may, in cross section, be similar in shape to that of an ACME thread, so that engagement of the locking member generates an axially-inward wedging force on the door, and when pressure is applied to the closure from within the pipe or pressure vessel, the inclined bearing surface transmits part of the axial force to the radial direction thus improving the engagement between the locking member and the pipe or pressure vessel. In a still further alternative construction, the ribs include two bearing surfaces both of which are inclined to the axis of the locking member, diverging at different angles from the axis of the locking member in the direction in which pressure will be applied to the closure during use. In this way, the ribs "hook" the door into engagement with the pipe or pressure vessel and application of pressure to the closure causes even tighter engagement of the closure with the pressure vessel or pipe. Suitable configuration of the ribs of the locking member are described in more detail in our earlier patent specification No. 23537/74.

Preferably, where the peripheral surface of the locking member includes a plurality of ribs, the ribs are spaced axially from each other and the maximum diameters of the ribs decrease in the axial direction of the locking member.

The size of the space between the ends of the locking member when the locking member is in its expanded condition is determined by the extent by which the locking member must be contracted to disengage it from the aperture in the pipe or pressure vessel. Thus, where the peripheral surface is provided with ribs which engage with corresponding grooves in the walls of the pipe or pressure vessel, the ends of the locking member will be separated by at least $2\pi$ times the radial depth to which the ribs penetrate into the grooves. It will be appreciated that the radial contraction required of the locking member is not related directly to the diameter of the locking member itself. Thus, for any predetermined radial depth of engagement between the locking member and walls of the pipe or pressure vessel, the same distance between the ends of the locking member and the same operating mechanism may be used for a wide range of sizes of closures.

The locking member preferably includes a segmental block which is adapted to fit between the ends of the locking member when the locking member is expanded. In use, this block is inserted between the ends of the locking member after the locking member has been expanded so that, when locked, the closure is in engagement with the aperture in the pipe or pressure vessel around the whole of the periphery of the door.

Any suitable mechanism may be used for moving the ends of the locking member towards and away from each other, for example, mechanical linkages or fluid cylinders. One suitable mechanical linkage comprises two levers pivotally mounted on the door, one end of each lever engaging with a respective end of the locking member, the other ends of the levers being mounted for movement towards and away from each other by means of a double ended lead screw rotatably mounted in the closure.

If desired, all or part of the operating mechanism for moving the ends of the locking member may be removably mounted in the door. The removal of the operating mechanism for the locking member thus prevents accidental or unauthorised opening of the closure. When part of the operating mechanism is permanently mounted in the door, the mechanism is preferably housed in a recess in the door which is itself closed by a cover mounted on the door, thus protecting the operating mechanism from damage by dirt or corrosion.

In view of the fact that, in large installations, the closure is likely to be heavy, the closure preferably further comprises a hinge assembly by means of which the door may be mounted on the pipe or pressure vessel. Since the closure will generally be of considerable thickness, the removal of the closure from the aperture in the pipe or pressure vessel will first require axial movement of the closure relative to the aperture before the closure can be pivoted to one side. The hinge assembly therefore preferably comprises a main bracket adapted to be secured to the pipe or pressure vessel, a secondary bracket pivotally mounted on the main bracket, and a support for the door pivotally mounted on the second bracket for movement about an axis parallel to the pivot axis of the secondary brackets. This construction allows the closure to be withdrawn generally axially from the aperture before being pivoted to one side of the aperture.

Preferably the support for the door is releasably connected to the door so that the hinge assembly can be disconnected from the door and, desirably, also the pipe or pressure vessel for separate storage.

The invention also includes an access port for a pipe or pressure vessel comprising a body portion secured or adapted to be secured within the walls of the pipe or pressure vessel and a closure according to the invention mounted in an aperture in the body portion, the body portion defining a bearing face around the periphery of the aperture against which the locking member abuts when the closure is locked in the aperture.

The access port will preferably comprise a seal which is located between two opposed faces on the closure and body portion respectively.

The invention provides a seal which, in its preferred form, is particularly adapted for use with the access ports of the present invention.

The seal of the present invention comprises a support of relatively rigid material having first and second flanges adapted to engage respective opposed faces, the first flange having a greater surface area than the second flange and being less flexible than the second flange, and a lining of relatively flexible material carried by the support and extending beyond the terminal edges of the flanges.

The shape of the seal will usually conform to the shape of the aperture and closure. In most cases annular seals will be used.

The disposition of the flanges of the seal relative to the plane of the seal will depend upon the relative dispositions of the bearing faces between which the seal in interposed. Thus, where the two bearing faces extend at right angles to the axis of the aperture, the flanges of the seal will extend in planes parallel to the plane of the seal.

The materials from which the support and lining are made will depend upon the pressures to which the seal is to be subjected. Thus, where the seal is to be subjected to comparatively low pressures, the support and the lining may composed of elastomers of different flexibilities. Where however the seal is to be subjected to relatively high pressures, the support is preferably composed of metal and the lining is preferably composed of an elastomeric material.

Preferably the two flanges of the support diverge from each other towards the tips of the flanges so that, in use, the tips of one or both of the flanges make first contact with the bearings surfaces against which the seal is disclosed.

Where the flanges extend in planes generally parallel to the plane of the seal, the flanges are preferably connected by a wall which has an external surface which tapers in the axial direction of the seal, the said surface converging in a direction from the first flange to the second flange. The seal can then be housed in a recess which is provided with a similarly converging surface as a result of which the seal will be pressed into position between the closure and the body portion of the access port when the closure is inserted into the aperture in the access port.

Figure 2:
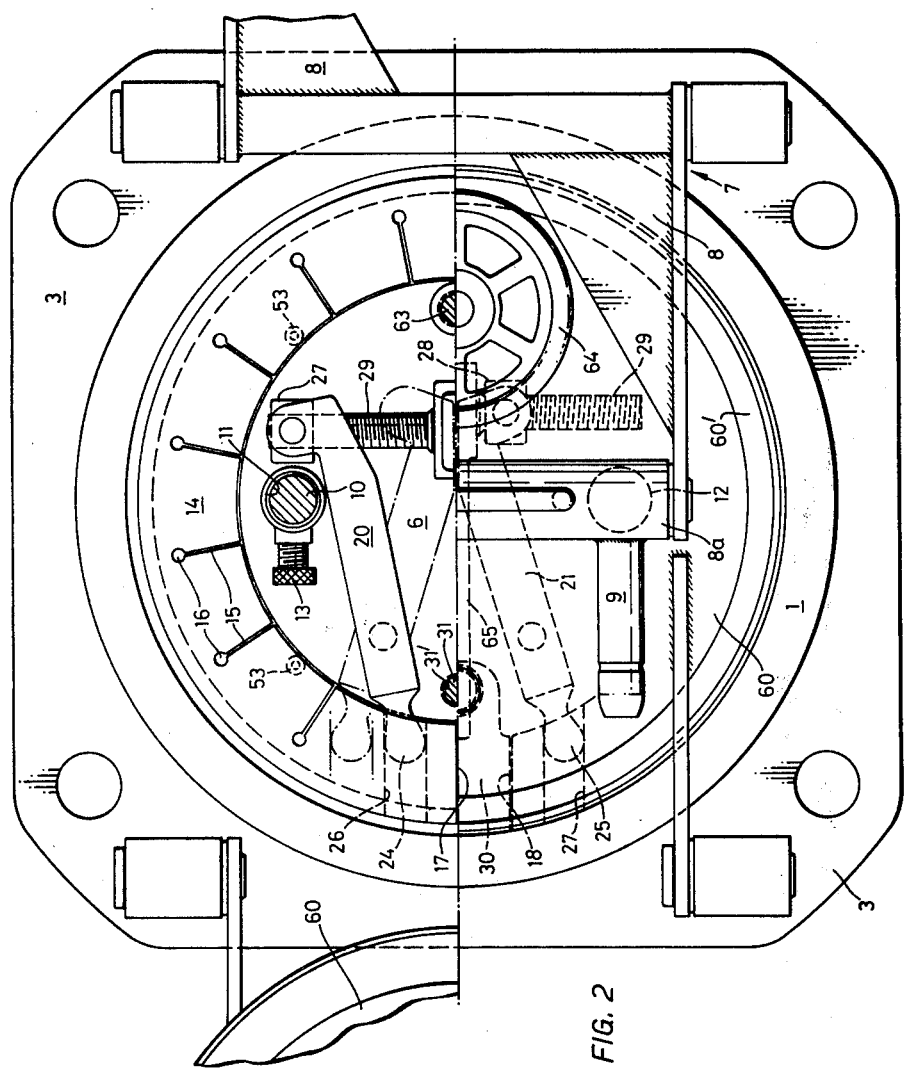

In order that the invention may be better understood a preferred embodiment of an access port for a pipe or pressure vessel and incorporating a seal and closure in accordance with the present invention will now be described by way of example only with reference to the accompanying drawings in which:

FIG. 1 is a side view, partly in section, of the access port, the upper and lower parts of the drawing illustrating the access port in its unlocked and locked conditions respectively, FIG. 1A illustrating a detail thereof on an enlarged scale, FIG. 2 is a partial front view, partly in cross section of the access port, the upper and lower parts of the drawing illustrating the port in its unlocked and locked conditions respectively.

The access port is symmetrical about the horizontal centre line of FIGS. 1 and 2.

The access port illustrated in the drawings is an outlet for a fluid pipeline and comprises a body portion 1 in the form of a socket which is welded to the end of the pipeline 2. The socket 1 is reinforced by a generally rectangular rib 3 which is mounted adjacent the mouth of the socket.

A closure indicated generally at 5 is mounted in the mouth of the socket 1 and comprises a door 6 which is mounted on the rib 3 by means of a hinge assembly indicated generally at 7.

The hinge assembly 7 includes a main bracket 8 pivotally mounted upon the rib 3 for movement about a vertical axis, and a secondary bracket 8a pivotally mounted at one end of the main bracket 8 for movement about a vertical axis. The secondary bracket 8a carries two supporting pins 9, 10 which releasably engage in sockets 11, 12 on the door 6 and may be retained therein by a manually rotatable lock nut 13 threaded into the sockets 11, 12.

A C-shaped locking member 14 is disposed around the periphery of the door 6. As best seen in FIG. 2, the locking member 14 is generally annular in shape, one segment of the annulus having been cut away. A series of recesses in the form of radial slots 15 extend from the internal peripheral surface of the locking member 14 and terminate in axial bores 16 of larger diameter than the width of the slot 15.

The locking member 14 terminates in two parallel end faces 17, 18. These two end faces may be brought into contact with each other, thus causing radial expansion and contraction of the locking member 14, by means of a locking mechanism best illustrated in FIG. 2. The locking member 14 is mounted adjacent one face of the door 6 so that the locking member 14 and the door 6 define a recess 19 within which the locking mechanism and the sockets 11, 12 for the pins 10 of the hinge assembly 7 are mounted.

The locking mechanism comprises two levers 20, 21 which are pivotally mounted in the door 3 for movement about axes which coincide with the centres of curvature of the loci of the ends 17, 18 of the locking member 14, thus minimising movement, and therefore wear, between the levers 20, 21 and the locking member 14. One end 24, 25 of each lever is shaped to form a ball which is received in a respective socket 26, 27 adjacent each end of the locking member 14. The other ends of the levers 20, 21 are pivotally connected to internally threaded blocks 27, 28 which are mounted on respective ends of a double ended lead screw 29, which is itself rotatably mounted in a bracket on the door 6. The ends of the lead screw 29 are provided with opposite-handed threads so that rotation of the lead screw causes the blocks 27, 28 to move towards or away from each other. The lead screw may be rotated by a ratchet spanner 65 which is permanently connected to the lead screw 29 and may be housed horizontally within the recess 19 when not in use, as illustrated in FIG. 2.

When the locking member 10 is in its expanded position, illustrated in broken lines in the upper and lower parts of FIG. 2, a block 30 may be inserted between the end faces 17, 18 of the locking member 14 so that the locking member 14 and the block 30 completely surround the periphery of the closure 5. The block 30 is secured to the door 6 by means of a bolt which is captively mounted in a bolt-hole 31' in the door 6. The bolt hole 31 communicates with the interior of the socket 1 through a pressure vent (not shown) which is closed when the bolt is fully tightened. Removal of the bolt to release the block 30 will thus give the operator a visible or audible warning that the pipeline 2 is pressurised.

As best seen in FIG. 1, the peripheral surface of the locking member is provided with five peripheral ribs 32 to 36. Each of the ribs includes a bearing surface 37 which extends approximately at right angles to the axis of the locking member 14. Each of the bearing surfaces of the ribs 32 to 36 engages with a corresponding bearing surface 38 formed on the interior surface of the socket 1 adjacent the mouth of the socket. As seen in FIG. 1, the maximum diameters of the ribs 32 to 36 decrease in the axial direction of the locking member, the rib 32 which is located furthest within the socket 1 when the closure is in position, as illustrated in FIG. 1, being of smallest maximum diameter.

The door 6 engages a shoulder 40 formed on the internal surface of the socket 1, and a seal 41 is positioned between two sealing faces 42, 43 on the door and the socket 1 respectively adjacent the shoulder 40. These faces are flat annular surfaces extending in planes parallel to the plane of the door. They are therefore easily manufactured and cleaned. If desired the sealing faces could be formed as conical surfaces on the door and/or socket but this would involve additional manufacturing difficulties.

The seal 41 comprises an annular metal support 44 (FIG. 1a) of generally U-shaped cross-section comprising a wall 45 and first and second flanges 46, 47 respectively which extend generally parallel to the plane of the annular seal 41 and abut the opposed sealing faces 42, 43 on the door 6 and socket 1. In their natural, uncompressed condition, the two flanges 46, 47 diverge from each other towards the centre of the seal. In the illustrated seal, the first flange extends parallel to the plane of the seal, the second seal extending in a conical surface. It will be appreciated that in alternative constructions, the first flange or both flanges could be arranged to extend along conical surfaces.

The first flange 46 is of greater radial length than the second flange 47. The first flange 46 is also axially thicker than the second flange 47 and is therefore less flexible than the second flange 47. An annular groove 48 is formed in one face of the first flange 46 allowing the first flange to be deflected inwardly towards the second flange 47.

An elastomeric lining 49 is mounted within the support 44 and is also of generally U-shaped cross section. The lining 49 extends along the inner walls of the support 44 and beyond the terminal edges of the flanges 46, 47 in the radial direction and also, to a lesser extent, in the axial direction so that the ends of the lining 49 abut the sealing faces of the door and the socket.

Although the seal may be mounted on either the door 6 or the socket, it is preferably attached to the door 6 so that it is less susceptible to damage or displacement during loading or unloading of the pipeline 2 through the open access port. The seal is loosely secured to the door 6 by a set of spring clips 50 bolted on to a raised circular boss 51 on the internal face of the door 6 of smaller diameter to the internal diameter of the first flange 46. The seal can therefore be easily removed from and mounted on the door 6 for cleaning. When mounted on the door 6, the first flange 46 of the seal overlies a circular array of bolt holes 52 each of which contains a respective set screw 53. The set screws 53 are of greater length than the bolt holes 52 so that, when the ends of the set screws 53 are disengaged from the first flange 46, their heads project beyond the outer face of the door 6, immediately adjacent the internal surface of the locking member 14. The set screws 53 must therefore be threaded into the bolt holes 52 before the locking member can be contracted, thus deflecting the first flange 46 away from the sealing face 42 of the door, this deflection being facilitated by the groove 48 in the first flange 46. As a result, the seal between the door and socket will be broken, drawing the operator's attention to the presence of pressurised fluid in the pipeline 2.

A cover or weather door 60 carrying a flexible weather seal 60' is hinged to the rib 3, and, when the hinge assembly 7 is disengaged from the door 6 can be swung into engagement with the locking member 14, thus enclosing the sockets 11, 12 and the operating mechanism for the locking member 14 within the recess 19. A series of keys 61 on the internal face of the cover 60 are positioned to engage between the locking member 14 and a circular boss 62 on the external surface of the door 6 when the locking member 14 is in its expanded condition, thus preventing the cover 60 from being closed whilst the locking member 14 is contracted.

The cover 60 is secured to the door 6 by means of a bolt 63 mounted in a threaded bore in the door 6 which communicates with the interior of the pipeline 2 through a pressure vent. When the bolt 63 is withdrawn by rotating a hand wheel 63' (see FIG. 2) any fluid under pressure will emerge through the bore thus giving the operator a visible or audible indication that the pipeline is pressurised.

When closed, the access port of the present invention will occupy the position illustrated in the lower parts of FIGS. 1 and 2. If it is desired to open the access port, the hand wheel 64 on the cover 60 is rotated, thus withdrawing the bolt 63 from the door 6 and releasing the cover. The cover is then swung into its open position as illustrated in the upper part of FIG. 2. At this moment, any pressurised fluid in the pipeline 2 would leak through the bore for the bolt 63 and would be observed by the operator.

The set screws 53 are then driven fully into the threaded bores in the door 6 so that the first flange 46 of the seal is lifted out of engagement with the sealing face 43 of the door 6. Again, any fluid under pressure in the pipeline 2 would reveal itself to the operator.

The bolt securing the block 30 to the door is then withdrawn from bolt hole 31, again giving the operator a visible or audible warning of pressure fluid in the pipeline 2. The block 30 is then removed from between the end faces 17, 18 of the locking member 14. The block is preferably chained or otherwise attached to the cover 60 so that the cover 60 cannot be closed unless the block 60 is in position between the ends 17, 18 of the locking member 14. Preferably, the length of the spanner 65 is such that the block 30 must be positioned wholly within the gap between the ends 17, 18 of the locking member before the spanner can be returned to its storage position in the recess 19, thus permitting the cover 60 to be closed.

Using the ratchet spanner 65 the operator then rotates the lead screw 29 so that the blocks 27, 28 move away from each other. This in turn causes the ends 24, 25 of the levers 20, 21 to approach each other thus bringing the faces 17, 18 of the locking member 14 into engagement with each other. As a result, the locking member 14 is contracted radially by an amount sufficient to disengage the ribs 31 to 35 from the corresponding recesses in the socket 1.

In order to withdraw the closure 5 from the socket 1, the operator inserts the pins 9, 10 of the hinge assembly 7 into the sockets 11, 12 on the door 6 and secures the pins by means of the lock nuts 13. He then pulls the door 6 axially out of the socket 1. After completion of this axial motion, the door 6 can be swung on the hinge assembly to one side, as illustrated in the upper part of FIG. 2.

In order to close the access port, the reverse of the above procedure is adopted. During the closing movement, the seal, which is carried on the inner surface of the door 6 by the clips 50, is first driven into the recess in the socket 1 adjacent the shoulder 40. The tapering external surface of the wall 44 assists in positioning the seal in its recess.

The first part of the seal 41 to contact the sealing face of the socket 1 is the tip of the second flange 47. As the door 6 is closed, the flange is progressively deflected until the second flange of the seal 41 occupies the position illustrated in FIG. 1.

When the door 6 is in place and locked in position, with the set screws withdrawn, the flanges of the seal are held in engagement with the respective sealing faces of the socket and door by the elasticity of the support 44. When the pipeline 2 is pressurised, a greater force will be applied to the first flange 46 by the fluid under pressure than to the second flange 47 since the first flange has a greater surface area than the second flange. Consequently if the door 6 should move under the pressure, the first flange will remain firmly in contact with the sealing face of the door. The initial compression of the seal 41 between the socket and the door will cause the second flange to move away from the door 6 to accommodate any initial movement of the door under the fluid pressure. If the fluid pressure should cause the door 6 to move even further out of the socket 1, the second flange will deflect under the fluid pressure and remain in engagement with the sealing surface on the socket 1. The seal 41 is therefore capable of accommodating movement of the doors in the socket 1 without damage or leakage. Since the support 44 is composed of metal the seal cannot extrude under the pressure of the fluid in the pipeline 2 into the relatively large gaps which may form between the door 6 and the socket 1 as a result of movement of the door 6. The elastomeric lining 49 extends radially beyond the tips of both the first and second flanges and axially beyond the tip of the second flange, so that any gaps which may develop between the first and second flanges and the sealing surfaces on the socket 1 and the door 6 resulting from irregularities in the sealing surfaces will be closed by the lining. The seal is therefore effective at low pressures as well as at high pressures and can be used safely in pipelines handling gases and toxic liquids.

The relatively narrow radial diameter of the seal 41 compared with the diameter of the door 6 ensures that the seal does not apply excessive thrust to the door 6 when under pressure. Moreover the simple geometry of the sealing faces of the door 6 and socket 1 facilitates manufacture and cleaning.

I claim:

1. A closure for a pipe or pressure vessel comprising a door adapted to fit into an aperture in a pipe or pressure vessel, an arcuate locking member disposed around the periphery of the door for locking the door to the pipe or pressure vessel, means for moving the ends of the locking member away from and towards each other to cause radial expansion and contraction of the locking member, whereby the locking member may be brought into and out of locking engagement with the pipe or pressure vessel, and a hinge assembly by means of which the door may be mounted on the pipe or pressure vessel, said hinge assembly comprising a main bracket adapted to be secured to the pipe or pressure vessel, a secondary bracket pivotally mounted on the main bracket and a support for the door mounted on the secondary bracket for movement about an axis parallel to the pivot axis of the secondary bracket.

2. A closure according to claim 1 wherein the locking member comprises a generally annular body provided with at least one radial recess which facilitates the radial expansion and contraction of the locking member.

3. A closure according to claim 2 wherein each recess comprises a slot which terminates at an axial bore in the locking member.

4. A closure according to claim 1 wherein the locking member comprises a plurality of segmental blocks mounted on C-shaped rings.

5. A closure according to claim 1 wherein the peripheral surface of the locking member includes at least one peripheral rib one surface of which forms a bearing surface adapted to engage with a corresponding bearing surface in the walls of the pipe or pressure vessel.

6. A closure according to claim 5 wherein the peripheral surface of the locking member includes a plurality of the said ribs, spaced axially from each other, the maximum diameters of the ribs decreasing in the axial direction.

7. A closure according to claim 5 wherein the bearing surface of the rib lies at right angles to the axis of the locking member.

8. A closure according to claim 1 further including a segmental block adapted to fit between the ends of the locking member when the locking member is expanded.

9. A closure according to claim 1 wherein the means for moving the ends of the locking member towards and away from each other comprises two levers pivotally mounted on the door, one end of each lever engaging with a respective end of the locking member, the other ends of each lever being mounted for movement towards and away from each other in a double ended lead screw rotatably mounted on the closure.

10. A closure according to claim 1 wherein the means for moving the ends of the locking member is removably mounted on the door.

11. A closure according to claim 1 wherein the means for moving the ends of the locking member is housed in a recess in the closure closed by a cover mounted on the closure.

12. A closure according to claim 1 wherein the support for the door is releasably connected to the door.

13. An access port for a pipe or pressure vessel comprising a body portion secured or adapted to be secured within the walls of the pipe or pressure vessel, and a closure according to claim 1 mounted in an aperture in the body portion, the body portion defining a bearing face around the periphery of the aperture against which the locking member abuts when the closure is locked in the aperture.

14. An access port according to claim 13 further comprising a seal located between two opposed faces on the closure and body portion respectively.

15. A closure according to claim 1 together with a seal between an end face of said door and an abutment on said pipe or pressure vessel, said seal including a support of relatively rigid material and having first and second flanges for engaging said door end face and said abutment, respectively, said first flange having a greater surface area than said second flange and being less flexible than said second flange, and a lining of relatively flexible material as compared to said flanges carried by said support and extending between said flange terminal edges.

16. A closure according to claim 15 wherein said support is composed of metal and said lining is composed of an elastomer.

* * * * *